(12) United States Patent
Blanco et al.

(10) Patent No.: US 12,341,837 B2
(45) Date of Patent: *Jun. 24, 2025

(54) OUT-OF-HOME INTERNET CONNECTED HOUSEHOLD IDENTIFICATION

(71) Applicant: VIANT TECHNOLOGY LLC, Irvine, CA (US)

(72) Inventors: Fabrizio Blanco, Los Angeles, CA (US); Giuseppe Di Mauro, San Diego, CA (US)

(73) Assignee: VIANT TECHNOLOGY LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,039

(22) Filed: Mar. 19, 2024

(65) Prior Publication Data

US 2024/0223634 A1 Jul. 4, 2024

Related U.S. Application Data

(63) Continuation of application No. 17/546,548, filed on Dec. 9, 2021, now Pat. No. 11,936,703.

(51) Int. Cl.
*H04L 65/612* (2022.01)
*H04L 43/16* (2022.01)
(Continued)

(52) U.S. Cl.
CPC ........ *H04L 65/612* (2022.05); *H04L 61/5007* (2022.05); *H04L 65/1069* (2013.01);
(Continued)

(58) Field of Classification Search
CPC ............... H04L 65/612; H04L 61/5007; H04L 65/1069; H04L 61/5046; H04L 12/2809;
(Continued)

(56) References Cited

U.S. PATENT DOCUMENTS

| 5,964,839 A | 10/1999 | Johnson et al. |
| 6,151,601 A | 11/2000 | Papierniak et al. |

(Continued)

FOREIGN PATENT DOCUMENTS

| KR | 20090000995 | 1/2009 |
| WO | 2006058274 | 6/2006 |
| WO | 2010120359 | 10/2010 |

OTHER PUBLICATIONS

PCT International Search Report & Written Opinion dated Feb. 7, 2023 for PCT Application No. PCT/US2022/080055.

(Continued)

*Primary Examiner* — Tonia L Dollinger
*Assistant Examiner* — Mehulkumar J Shah
(74) *Attorney, Agent, or Firm* — Gates & Cooper LLP

(57) ABSTRACT

A system and method provide media content based on a household when out-of-home. A first request for media content is received that originates from a first IP address and includes a first data element identification that is associated with a first user. A determination is made that the first IP address is associated with a first internet connected household (ICH). The first data element identification is aliased with the first ICH. A second request (that includes the first data element identification) for media content is received that originates from a second IP address that corresponds to a non-household IP address. In response to the second request and the aliasing, media content is retrieved (based on the first ICH) and transmitted to the first user at the second IP address.

17 Claims, 7 Drawing Sheets

(51) Int. Cl.
*H04L 61/5007* (2022.01)
*H04L 65/1069* (2022.01)
*H04L 65/1076* (2022.01)
*H04L 67/30* (2022.01)

(52) U.S. Cl.
CPC .......... *H04L 65/1076* (2013.01); *H04L 67/30* (2013.01); *H04L 43/16* (2013.01)

(58) Field of Classification Search
CPC ..... H04L 43/04; H04L 43/08; H04L 43/0876; H04L 43/16; H04L 61/00; H04L 61/4511; H04L 67/02; H04L 61/2514; H04L 12/40045; H04L 43/0817; H04L 12/28; H04L 65/1076; H04L 67/30; H04L 65/4084; H04L 61/5053; H04L 65/1073; H04L 2101/69; H04L 101/69
See application file for complete search history.

(56) References Cited

U.S. PATENT DOCUMENTS

| | | |
|---|---|---|
| 6,427,170 B1 | 7/2002 | Sitaraman et al. |
| 6,681,232 B1 | 1/2004 | Sistanizadeh et al. |
| 6,792,458 B1 | 9/2004 | Muret et al. |
| 6,978,270 B1 | 12/2005 | Carty et al. |
| 7,039,699 B1 | 5/2006 | Narin et al. |
| 7,506,360 B1 | 3/2009 | Wilkinson et al. |
| 7,600,016 B2 | 10/2009 | Bean |
| 8,214,486 B2 | 7/2012 | Britton et al. |
| 8,533,322 B2 | 9/2013 | Chamberlain et al. |
| 8,996,727 B2 | 3/2015 | DeFrancesco et al. |
| 9,038,178 B1 | 5/2015 | Lin |
| 9,331,921 B2 | 5/2016 | DeFrancesco et al. |
| 10,728,350 B1 | 7/2020 | Khanwalkar et al. |
| 10,764,240 B2 | 9/2020 | DeFrancesco et al. |
| 2002/0128925 A1 | 9/2002 | Angeles |
| 2003/0172136 A1 | 9/2003 | Katagawa et al. |
| 2004/0030931 A1 | 2/2004 | Chamandy et al. |
| 2004/0073533 A1 | 4/2004 | Mynarski et al. |
| 2005/0015584 A1 | 1/2005 | Takechi et al. |
| 2005/0033641 A1 | 2/2005 | Jha et al. |
| 2005/0114496 A1 | 5/2005 | Fang et al. |
| 2005/0286686 A1 | 12/2005 | Krstulich |
| 2006/0136372 A1 | 6/2006 | Schunemann |
| 2006/0288096 A1 | 12/2006 | Yim |
| 2008/0033794 A1 | 2/2008 | Ou et al. |
| 2008/0101353 A1 | 5/2008 | Streijl et al. |
| 2008/0201311 A1 | 8/2008 | Ertugrul et al. |
| 2008/0274736 A1 | 11/2008 | Hu |
| 2008/0281699 A1 | 11/2008 | Whitehead |
| 2009/0034521 A1 | 2/2009 | Kato |
| 2009/0113062 A1 | 4/2009 | Woodman |
| 2009/0125397 A1 | 5/2009 | Gomaa et al. |
| 2010/0191577 A1 | 7/2010 | Lu et al. |
| 2011/0016206 A1 | 1/2011 | Kodialam et al. |
| 2011/0087780 A1 | 4/2011 | McCann et al. |
| 2011/0231497 A1 | 9/2011 | Tovar |
| 2011/0276689 A1 | 11/2011 | Rosen |
| 2011/0287764 A1 | 11/2011 | Zitnik |
| 2011/0314495 A1 | 12/2011 | Zenor |
| 2012/0102169 A1 | 4/2012 | Yu et al. |
| 2012/0124607 A1 | 5/2012 | Georgakis |
| 2013/0006706 A1 | 1/2013 | Harvey et al. |
| 2013/0086245 A1* | 4/2013 | Lu .......................... H04L 12/66 709/250 |
| 2013/0212188 A1 | 8/2013 | Duterque et al. |
| 2013/0276027 A1 | 10/2013 | Sheehan et al. |
| 2013/0311649 A1 | 11/2013 | DeFrancesco et al. |
| 2014/0006951 A1 | 1/2014 | Hunter |
| 2014/0304397 A1 | 10/2014 | DeFrancesco et al. |
| 2015/0371272 A1 | 12/2015 | Vanderhook et al. |
| 2016/0253711 A1 | 9/2016 | Sankaran et al. |
| 2016/0275563 A1* | 9/2016 | Sankaran ............... G06Q 30/02 |
| 2017/0024778 A1* | 1/2017 | Knapp ............... G06Q 30/0277 |
| 2018/0046465 A1 | 2/2018 | Jacoby et al. |
| 2019/0037358 A1 | 1/2019 | Jenkins et al. |
| 2022/0014496 A1 | 1/2022 | Anderson |
| 2022/0337562 A1 | 10/2022 | Sonawalla et al. |

OTHER PUBLICATIONS

"About publisher provided identifiers", Google Ad Manager Help, https://support.google.com/admanager/answer/2880055?hl=en, pp. 1-4, as printed Nov. 2, 2021.

"identifierForVendor", Apple Developer Documentation, https://developer.apple.com/documentation/uikit/uidevice/1620059-identifierforvendor, pp. 1-2, as printed Nov. 2, 2021.

"Quick Facts United States", United States Census Bureau, Nov. 2, 2016. http://quickfacts.census.gov/qfd/meta/long_HSD310200.htm.

"Regional Internet registry", Wikipedia, The Free Encyclopedia, Nov. 2, 2016. http://en.wikipedia.org/wiki/Regional_Internet_registry.

Mitchell, B., "What is an IP Address?", Lifewire, Oct. 29, 2016. http://compnetworking.about.com/od/workingwithipaddresses/g/ip-addresses.htm.

"TCP/IP Introduction", w3schools.com, WayBackMachine, May 5, 2012. https://web.archive.org/web/20120505075449/http://w3schools.com/tcpip/tcpip_intro.asp.

Mitchell, B., "HTTP—HyperText Transfer Protocol", Lifewire, Jun. 30, 2016. http://compnetworking.about.com/od/networkprotocols/g/bldef_http.htm.

Crawford, Gregory S., "Household Internet Use: Implications for Online Competition and Market Structure", Dept. of Economics, Duke University, 1999. http://ftp.econ.duke.edu/gsc/ecfacts.pdf.

Kihl, Maria, et al., "Traffic analysis and characterization of Internet user behavior", Ultra Modern Telecommunications and Control Systems and Workshops (ICUMT), 2010 International Congress on IEEE, 2010. http://lup.lub.lu.se/luur/download?func=downloadFile&recordOId=1734535&fileOId=2027068.

Xie, Yinglian, et al., "How Dynamic are IP Addresses?", ACM SIGCOMM '07, Kyoto, Japan, Computer Communication Review, vol. 37, No. 4, ACM, Aug. 27-31, 2007. http://131.107.65.14/pubs/63680/sigcomm07-onefile.pdf.

Canadian Office Action dated Mar. 27, 2025 for Canadian Patent Application No. 3,237,330.

Extended European Search Report dated Apr. 1, 2025 for European Patent Application No. 22905234.5.

Chen, Q., et al., "Cookie Swap Party: Abusing First-Party Cookies for Web Tracking", Proceedings of the 17th ACM Conference On Security and Privacy in Wireless and Mobile Networks, Apr. 2021, pp. 2117-2129.

* cited by examiner

| ARIN<br>American Registry for Internet Numbers | SEARCH WHOIS*RWS* [        ] |||||
|---|---|---|---|---|---|
| | *advanced search* |||||
| | NUMBER RESOURCES | PARTICIPATE | POLICIES | FEES & INVOICES | KNOWLEDGE | ABOUT US |

| ARIN Online enter ⓘ | WHOIS-RWS |
|---|---|

| Network | | RELEVANT LINKS |
|---|---|---|
| NetRange | 174.0.0.0 – 174.255.255.255 | |
| CIDR | 174.0.0.0/8 | > ARIN Whois/ Whois-RWS Terms of Service |
| Name | NET174 | |
| Handle | NET-174-0-0-0-0 | |
| Parent | | |
| Net Type | Allocated to ARIN | |
| Origin AS | | |
| Organization | American Registry for Internet Numbers (ARIN) | > Whois-RWS API documenta- tion |
| Registration Date | 2008-02-14 | |
| Last Updated | 2010-06-30 | |
| Comments | | |
| RESTful Link | http://whois.arin.net/rest/net/ NET-174-0-0-0-0 | > ARIN Technical Discussion Mailing List |
| See Also | Related POC records. | |
| See Also | Related organization's POC records. | > Sample stylesheet (xsl) |
| See Also | Related delegations. | |

| Network | |
|---|---|
| NetRange | 174.141.0.0 – 174.141.127.255 |
| CIDR | 174.141.0.0/17 |
| Name | NUVOX-IPV4-22-01 |
| Handle | NET-174-141-0-0-1 |
| Parent | NET174 (NET-174-0-0-0-0) |
| Net Type | Direct Allocation |
| Origin AS | |
| Organization | Windstream Nuvox, Inc. (WN-6) |
| Registration Date | 2008-12-16 |
| Last Updated | 2012-03-02 |
| Comments | |

FIG. 2

OUT-OF-HOME INTERNET CONNECTED HOUSEHOLD IDENTIFICATION

CROSS-REFERENCE TO RELATED APPLICATIONS

This application is a continuation under 35 U.S.C. § 120 of application Ser. No. 17/546,548, filed on Dec. 9, 2021 (now U.S. Pat. No. 11,936,703 issued on Mar. 19, 2024) with inventor(s) Fabrizio Blanco and Giuseppe Di Mauro, entitled "OUT-OF-HOME INTERNET CONNECTED HOUSEHOLD IDENTIFICATION," which application is incorporated by reference herein.

This application is related to the following co-pending and commonly-assigned patent application(s), which is/are incorporated by reference herein:

U.S. patent application Ser. No. 17/008,215, filed on Aug. 31, 2020 (now U.S. Pat. No. 11,310,195 issued on Apr. 19, 2022), by Brian C. DeFrancesco, Timothy C. Vanderhook, and Christopher J. Vanderhook, entitled "INTERNET CONNECTED HOUSEHOLD IDENTIFICATION FOR ONLINE MEASUREMENT & DYNAMIC CONTENT DELIVERY," which application is a continuation of and claims the benefit of U.S. patent application Ser. No. 15/144,389, filed on May 2, 2016 (now U.S. Pat. No. 10,764,240 issued on Sep. 1, 2020), by Brian C. DeFrancesco, Timothy C. Vanderhook, and Christopher J. Vanderhook, entitled "INTERNET CONNECTED HOUSEHOLD IDENTIFICATION FOR ONLINE MEASUREMENT & DYNAMIC CONTENT DELIVERY,"which application claims the benefit under 35 U.S.C. Section 120 of U.S. patent application Ser. No. 13/895,587, filed on May 16, 2013 (now U.S. Pat. No. 9,331,921 issued on May 3, 2016), by Brian C. DeFrancesco, Timothy C. Vanderhook, and Christopher J. Vanderhook, entitled "INTERNET CONNECTED HOUSEHOLD IDENTIFICATION FOR ONLINE MEASUREMENT & DYNAMIC CONTENT DELIVERY,"which application claims the benefit under 35 U.S.C. Section 119(e) of U.S. provisional patent application Ser. No. 61/648,341, filed on May 17, 2012, by Brian C. DeFrancesco, Timothy C. Vanderhook, and Christopher Vanderhook, entitled "INTERNET CONNECTED HOUSEHOLD IDENTIFICATION FOR ONLINE MEASUREMENT & DYNAMIC CONTENT DELIVERY,"

U.S. patent application Ser. No. 14/223,676, filed on Mar. 24, 2014, now U.S. Pat. No. 8,996,727, issued on Mar. 31, 2015, by Brian C. DeFrancesco, Timothy C. Vanderhook, and Christopher J. Vanderhook, entitled "INTERNET CONNECTED HOUSEHOLD IDENTIFICATION FOR ONLINE MEASUREMENT & DYNAMIC CONTENT DELIVERY," which application is a continuation of U.S. patent application Ser. No. 13/895,587, filed on May 16, 2013, by Brian C. DeFrancesco, Timothy C. Vanderhook, and Christopher J. Vanderhook, entitled "INTERNET CONNECTED HOUSEHOLD IDENTIFICATION FOR ONLINE MEASUREMENT & DYNAMIC CONTENT DELIVERY,"which application claims the benefit under 35 U.S.C. Section 119(e) of U.S. provisional patent application Ser. No. 61/648,341, filed on May 17, 2012, by Brian C. DeFrancesco, Timothy C. Vanderhook, and Christopher Vanderhook, entitled "INTERNET CONNECTED HOUSEHOLD IDENTIFICATION FOR ONLINE MEASUREMENT & DYNAMIC CONTENT DELIVERY,"

U.S. patent application Ser. No. 17/078,869, filed on Oct. 23, 2020 (now U.S. Pat. No. 11,463,403 issued on Oct. 4, 2022), by Brian C. DeFrancesco, Timothy C. Vanderhook, and Christopher J. Vanderhook, entitled "INTERNET CONNECTED HOUSEHOLD IDENTIFICATION FOR ONLINE MEASUREMENT & DYNAMIC CONTENT DELIVERY,"which application is a continuation-in-part of U.S. application Ser. No. 17/008,215 filed on Aug. 31, 2020, which application is a continuation of U.S. application Ser. No. 15/144,389 filed on May 2, 2016 (now U.S. Pat. No. 10,764,240), which application is a continuation of U.S. application Ser. No. 13/895,587 filed on May 16, 2013 (now U.S. Pat. No. 9,331,921), which application claims the benefit of U.S. Application No. 61/648,341 filed on May 17, 2012, all of which applications are incorporated by reference herein.

BACKGROUND OF THE INVENTION

1. Field of the Invention

The present invention relates generally to household identification systems, and in particular, to a method, apparatus, and system for identifying and providing media content to users that are members of a household when such users are out of the home.

2. Definitions/Description of the Related Art

Household

The US Census Bureau defines a household as, "A household includes all the persons who occupy a housing unit. A housing unit is a house, an apartment, a mobile home, a group of rooms, or a single room that is occupied (or if vacant, is intended for occupancy) as separate living quarters. Separate living quarters are those in which the occupants live and eat separately from any other persons in the building and which have direct access from the outside of the building or through a common hall. The occupants may be a single family, one person living alone, two or more families living together, or any other group of related or unrelated persons who share living arrangements." (See http://quickfacts.census.gov/qfd/meta/long_HSD310200.htm).

Internet Connected Household (ICH)

An internet connected household is a household that uses the Internet at home. The US Census Bureau reports there are 81,939,000 households that use the Internet at home (internet connected households) in the United States. (Source: U.S. Census Bureau, Current Population Survey, October 2009).

Internet Service Provider (ISP)

An ISP is a company that supplies Internet connectivity to home and business customers. ISPs support one or more forms of Internet access, ranging from compnetworking.about.com/library/glossary/bldef-modem.htm dial-up to DSL (digital subscriber line) and cable modem compnetworking.about.com/library/glossary/bldef-broadband.htm service to dedicated T1/T3 lines to satellite or wireless access.

Regional Internet Registry

A regional Internet registry (RIR) is an organization that manages the allocation and registration of en.wikipedia.org/wiki/Internet number"\o"Internet number resources within a particular region of the world. Internet number resources include en.wikipedia.org/wiki/IP address and en.wikipedia.org/wiki/Autonomous system %28Internet %29 numbers.

The en.wikipedia.org/wiki/Internet_Assigned_Numbers_Authority (IANA) delegates Internet resources to the RIRs who, in turn, follow their regional policies to delegate resources to their customers, which include en.wikipedia.org/wiki/Internet_service_provider and end-user organizations.

Collectively, the RIRs participate in the en.wikipedia.org/wiki/Number_Resource_Organization, formed as a body to represent their collective interests, undertake joint activities, and coordinate their activities globally. The NRO has entered into an agreement with en.wikipedia.org/wiki/ICANN for the establishment of the en.wikipedia.org/wiki/Address_Supporting_Organisation (ASO), which undertakes coordination of global IP addressing policies within the ICANN framework. (See en.wikipedia.org/wiki/Regional_Internet_registry).

Internet Protocol Address (IP)

An IP address is a logical address for a compnetworking.about.com/od/hardwarenetworkgear/g/bldef_adapter.htm. Generally speaking, an IP address uniquely identifies computers on a TCP/IP network (transmission control protocol/Internet protocol network).

An IP address can be private—for use on a compnetworking.about.com/cs/lanvlanwan/g/bldef_lan.htm—or public—for use on the Internet or other compnetworking.about.com/cs/lanvlanwan/g/bldef_wan.htm. IP addresses can be determined statically (assigned to a computer by a system administrator) or dynamically (assigned by another device on the network on demand).

Two IP addressing standards are in use today. The IPv4 standard is most familiar to people and supported everywhere on the Internet. The IPv6 standard is the successor to IPv4 and is used to perform various addressing and routing methodologies including unicast addressing, anycast addressing, and multicast addressing.

IPv4 addresses consist of four compnetworking.about.com/cs/basicnetworking/g/bldef_byte.htm (32 bits). Each byte of an IP address is known as an compnetworking.about.com/od/workingwithipaddresses/g/bldef_octet.htm. Octets can take any value between 0 and 255. Various conventions exist for the numbering and use of IP addresses. (See compnetworking.about.com/od/workingwithipaddresses/g/ip-addresses.htm). IPv6 addresses consist of 16 bytes (128 bits), and as such has an enlarged address space compared to that of IPv4.

Transmission Control Protocol/Internet Protocol (TCP/IP)

TCP/IP is the communication protocol for the Internet. A computer communication protocol is a description of the rules computers must follow to communicate with each other. TCP/IP defines how electronic devices (like computers) should be connected to the Internet, and how data should be transmitted between them. Each computer must have an IP address before it can connect to the Internet and each IP packet must have an address before it can be sent to another computer. (See http://www.w3schools.com/tcpip/tcpip_intro.asp).

Hypertext Transfer Protocol (HTTP)

The Hypertext Transfer Protocol provides a standard for Web browsers and servers to communicate. HTTP is an application layer network protocol built on top of compnetworking.about.com/cs/basictcpip/g/bldef_tcpip.htm. HTTP clients (such as Web browsers) and servers communicate via HTTP request and response messages. (See http://compnetworking.about.com/od/networkprotocols/g/bldef_http.htm).

BACKGROUND

When a user is at home, a household identification (premised on a household IP address) allows for targeting, reach/frequency management, and measurement that marketers need in a cookieless world. However, what happens to the IP address when a user is not at home? When a user is on the go and a request for media content arrives, the IP address will indicate a cell tower or a business IP address as opposed to that user's household IP address. The patent applications cited above classify what is a residential household IP and what is not.

Other identifiers may also be referenced upon a media content/advertising call aside from an IP address. For example, upon a request for media content/advertising, a publisher-generated $1^{st}$ party cookie may be provided. The purpose of this $1^{st}$ party cookie identifier is for a publisher to be able to manage reach/frequency at the user level when the user visits the publisher's property/website multiple times. The $1^{st}$ party cookie is unique to the domain (e.g., www.cnn.com) and is not the same as the $3^{rd}$ party cookie, which is in decline. The $1^{st}$ party cookie is defined by the publisher and passed through upon advertising calls via an SSP (supply-side platform—software that is used to sell advertising in an automated fashion). SSPs are most often used by online publishers to help them sell display, video and mobile ads.

There are various prior art examples that provide a publisher ID/$1^{st}$ party cookie solution. For example, the GOOGLE's AD MANAGER 360 provides a publisher provided identifier (PPID) allows publishers to send through an identifier to use in frequency capping, audience segmentation/targeting, sequential ad rotation, and other audience-based ad delivery controls across devices. In another example, APPLE's IDENTIFIERFORVENDOR (IDFV) provides for a $1^{st}$ party ID for a vendor where the value of the property is the same for apps that come from the same vendor running on the same device.

As $3^{rd}$ party cookies deprecate, the question arises regarding whether $1^{st}$ party cookies can be used instead. However, $1^{st}$ party cookies cannot wholly replace the $3^{rd}$ party cookies because it only makes sense for the publisher.

In view of the above, there is a need to identify a target devices and users out of the home.

SUMMARY OF THE INVENTION

Embodiments of the invention leverage an identifier, for example a $1^{st}$ party cookie in tandem with a household identification to recognize users out of the home. For the sake of example, we'll refer to a $1^{st}$ party cookie hereon, but the example could be generalized to other identifiers, such as $3^{rd}$ party cookies, IFAs, IDFAs, etc. While a user is at home, the publisher (e.g., CNN) passes a $1^{st}$ party cookie along with the bid requests, which a server then associates to a household identification/identifier. Later, the publisher passes the same $1^{st}$ party cookie, but the request will originate from an IP address indicative of a non-household (e.g., a cell tower and not the household identification). By recognizing the same $1^{st}$ party cookie at home and on the go, embodiments of the invention recognize the device as belonging to the household identification referenced previously. All of this information sits at the household level, with a household identification as the connective tissue. Thereafter, the user, as identified via the $1^{st}$ party cookie can be targeted based on the household information whether the user is inside the household or out of the household.

BRIEF DESCRIPTION OF THE DRAWINGS

Referring now to the drawings in which like reference numbers represent corresponding parts throughout:

FIG. 2 illustrates the publicly available "who-is" information in accordance with one or more embodiments of the invention;

DETAILED DESCRIPTION OF THE PREFERRED EMBODIMENTS

Figure 1:
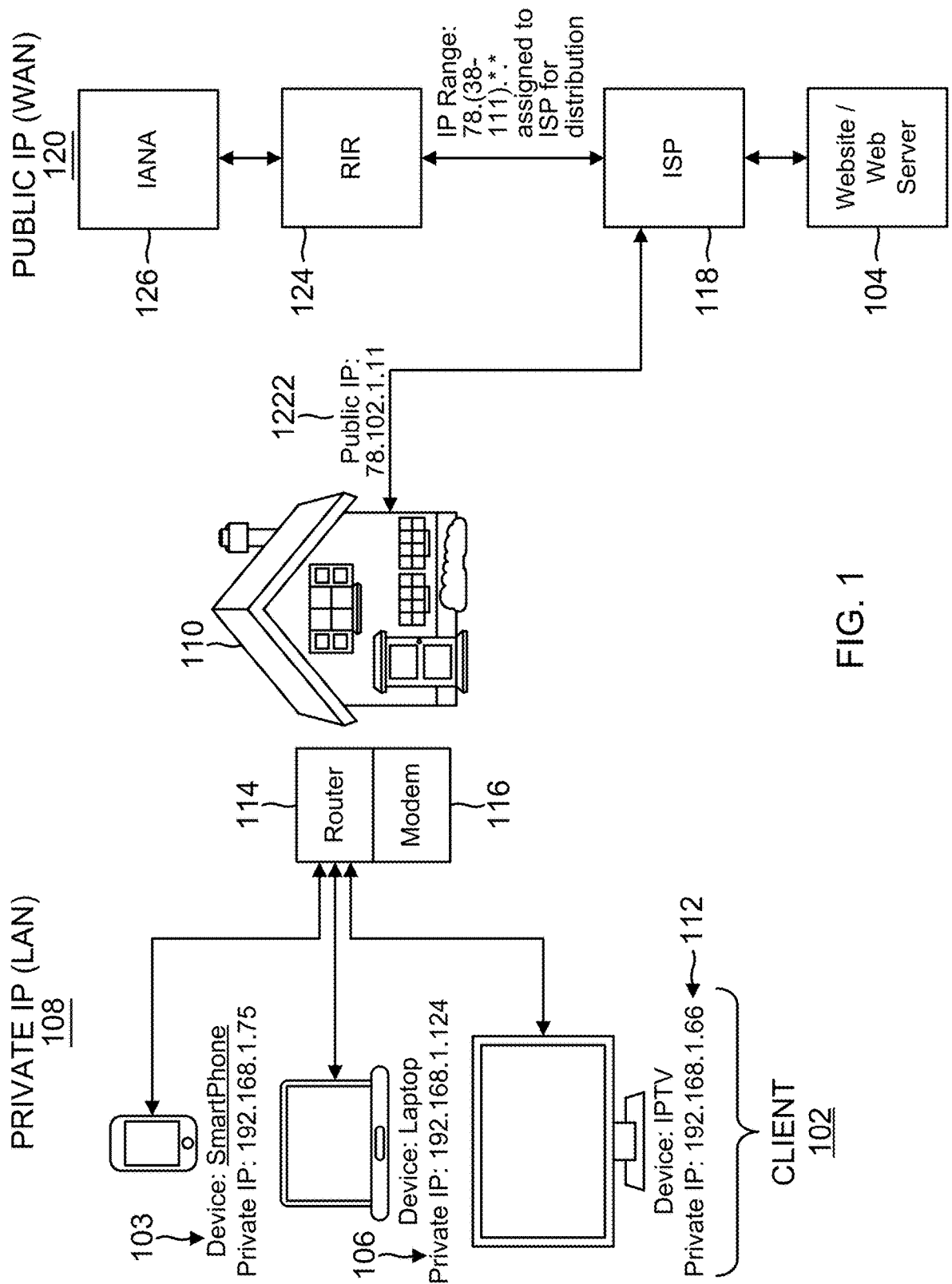
FIG. 1 illustrates a network, and communication on such a network, for identifying a household in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Media content targeting (including advertisements), regardless of channel or format, relies on audience, segmentation and targeting, validation, and measurement to ultimately maximize the return on investment. Traditional television targeting and measurement is based on ratings, channels, shows and day-parts. Over the last two decades, digital media content has opened the possibility to target at a very fine granularity, providing a better understanding of audience behavior and the ability to execute with speed and scale. However, the success/effectiveness of media content targeting and advertising is underpinned by the availability of $3^{rd}$ party cookies, mobile device identifiers, and data sharing among industry players without regard to end user consent.

Recent events have brought up end user privacy and catalyzed the movement of digital from a world of user opt-out (do-not-track), to EU GDPR (European Union General Data Protection Regulation) and consent frameworks, to major browsers disallowing $3^{rd}$ party cookies by default (e.g., APPLE SAFARI, MOZILLA FIREFOX, and GOOGLE CHROME [expected in 2023], to software companies (e.g., APPLE) instituting an opt-in mechanism to sharing IDFA (identifier for advertisers), to effectively a regulated world for the use of identifiers in general.

Over the years, while there have been multiple initiatives for universal IDs, catering for the needs of industry players, the first versions relied on cookies. Currently, TTD's (The Trade Desk's) UNIFIED ID 2.0 and LIVERAMP's ATS (Authenticated Traffic Solution) initiatives rely on publishers being able to secure email addresses from end users, in exchange for allowing content viewing. However, it is expected that not all publishers would be able to secure/foster such a relationship with end users, and even then, not for all of their media. Such circumstances leave the door open for a solution that is not based on email addresses.

Embodiments of the invention utilize household IP addresses as the bedrock of segmentation, targeting and measurement. From the perspective of a DSP (demand side platform), embodiments of the invention may provide for one or more of the following:

Targeting of end user data;
Frequency capping;
Reporting on reach/frequency/uniques;
Attribution (clicks, registrations, user acquisitions); and
Audience measurements/validation.

In addition, use cases already affected by the lack of identifiers, for which embodiments of the invention provide a solution include:

Targeting CTV (connected televisions);
Targeting $3^{rd}$ party cookie-less environments (e.g., SAFARI, FIREFOX, etc.); and
Targeting in-app iOS post iOS14.

Internet Connected Household Identification

Embodiments of the invention evaluate the IP address associated with a client computer request and determine whether the IP address belongs to an ISP that provides residential internet service. Further determinations are made regarding device activity (from the device associated with the IP address) (e.g., whether it exceeds a threshold level of activity expected from a household), and an IP assignment age (e.g., whether the age of the IP address exceeds a threshold age associated with households). Based on the determinations, a further determination can be made regarding whether the IP address/web request originates from an ICH (Internet Connected Household). Further details regarding the determination of an ICH are provided in the co-pending and cross-referenced patent applications cited above (e.g., including U.S. patent application Ser. No. 17/008,215 and the related patent family).

FIG. 1 illustrates a network, and communication on such a network, for identifying a household in accordance with one or more embodiments of the invention. As consumers/clients 102 use the Internet to connect with web server(s) 104 via HTTP(s), a Public IP address 106 is attached to each HTTP request that generates as a result of such web browsing activity.

In a typical scenario, the devices 102 inside a household are on a Local Area Network (LAN) 108 that is private to the Household 110. The IP address of each device 102 (IP addresses 103) within the household 110 is assigned by the router 114 (or modem 116). The modem 116 communicates with and receives Internet access from the ISP 118 on a wide area network (WAN) 120 that is usually public. The IP address 122 assigned to the home's modem 116 by the ISP 118 is public as it's what is used in communication with an outside web server 104.

In some cases, multiple homes 110 will be pooled together and will share the same public IP 120. These are typically in the cases of shared internet (apartment complex, college/university housing, etc.).

Furthermore, the public IP addresses 122 that the ISP 118 assigns to the household's modem 116 may be static or dynamic. In either case, the main relevant measure is the "stickiness" or age of the IP assignment. For example, if an IP 122 is assigned dynamically, but only on the reset of a modem 116, and the modem 116 is only reset once a year, the age of the IP address assignment for the Household 110 is one year.

When Household IPs assignment ages exceed a significant number of days, the Household public IP address 122 may serve as a unique identifier for all internet connected device 102 activity from within the Household 110 that are using the Household's ISP internet connection (all devices 102 will show the same public IP address 122 when they connect to web servers 104).

The system of Household identification (of embodiments of the invention) may use multiple criteria to evaluate each public IP address 122, that an internet entity with web servers 104 receives, to determine if each IP address 122 belongs to a Household 110.

Criteria 1: Public IP Belongs to an ISP that Provides Residential Internet Service Every public IP address is registered with a RIR 124 (regional internet registry) (which is delegated resources by IANA 126), and in general, most are a part of larger IP range blocks that belong to ISPs 118. This data is publicly available and each organization (ISP) 118 can be classified as providing or not providing residential internet service based on publicly available information regarding the company and their offerings.

For example, FIG. 2 illustrates the publicly available "who-is" information for the IP addresses 174.0.0.0/8 and 174.141.0.0/17 performed using ARIN (American Registry for Internet Numbers). The IP address 174.0.0.0/8 is part of a larger range block of IP addresses (i.e., 174.0.0.0-174.255.255.255) that is allocated to ARIN (an RIR). Using the information from ARIN, the IP address block ranges assigned to different organizations can be determined. As illustrated, the IP address 174.141.0.0/17 is part of a range block of IP addresses (i.e., 174.141.0.0-174.141.127.255) that are directly allocated to Windstream Nuvox, Inc. Windstream Nuvox is an ISP that provides residential internet service.

Accordingly, if an IP address 122 is registered with an RIR 124 (e.g., in a particular region of the world) and is part of an IP range block that belongs to an ISP that provides residential internet service, a determination can be made that the IP address 122 may be for an ICH. Similarly, if the ISP for that IP address does not provide residential service, a determination can be made that the IP address is not for an ICH.

Criteria 2: Device Activity from IP Does Not Exceed Threshold for ICH Usage Over a Period of Time By monitoring the activity (devices, users, events) for each IP address over a defined period of time (example 30 days), the IP addresses that are used by non-Households (businesses and other organization) are filtered out by the level of activity observed from these IPs over the time period.

For example, if there are 200 devices and 100 users that connect from the same IP address, the IP address may be associated with significant activity and is therefore likely that of a business or other (non-Household) organization.

In other words, the activity for each IP address is monitored over a defined period of time. If significant activity is found (i.e., above a threshold level) from a single IP address, it can be determined that the IP address is not for an ICH.

In addition to filtering out business and organizations, such criteria also provides a method to remove a small percentage of households 110 that have a short-lived IP assignment age. In this regard, if the IP is assigned frequently to households 110 in the ISP's customer base, the users and devices 102 from that IP accumulate and exceed the threshold to be considered a unique household identifier for any substantial period of time.

Criteria 3: The IP Assignment Age Must Be Greater Than a Defined Number of Days

In order to ensure an IP address is static enough that it can serve as an identifier for a reasonable period of time, the IP "stickiness" or assignment age is used. This is determined by observing the number of connecting IP addresses from the same ISP 118 over a defined period of time (e.g., 90 days). In other words, a determination is made if multiple different IP addresses are connected to each other and the combined IP assignment age of the "connected" IP addresses are utilized in the comparison to the threshold IP assignment age (i.e., 45 days).

A "connection" between two or more IP addresses belonging to the same ISP 118 is made when an identified user has generated activity from two IP addresses. For example, if a laptop user is identified (e.g., by a cookie) as user 123456 and the laptop participates in web browsing from within an ICH with public IP 100.100.1.1, and then two days later the ICH's IP is changed to 200.200.1.1 by the ISP 118, then the same user who generated activity behind 100.100.1.1 is found generating activity behind IP 200.200.1.1 which creates a connection between these two IP addresses. In other words, the same user is identified as belonging to the two IP addresses (e.g., using the cookie) and the activity on the combined connected IP addresses are utilized when determining if the IP assignment age is greater or less than 45 days.

Beyond a threshold of allowed connections (from people physically using a device inside another household 110— e.g., visiting a friend), the connection rate and volume will filter short aged IP assignments from being identified as Internet connected households 110 for use in measurement and content distribution.

This provides an additional method to remove a small percentage of households 110 that have a small IP assignment age as these IPs are assigned frequently to households 110 in the ISP's customer base and the users and devices from that IP accumulate and exceed the threshold to be considered a unique household identifier for any substantial period of time.

Figure 3:
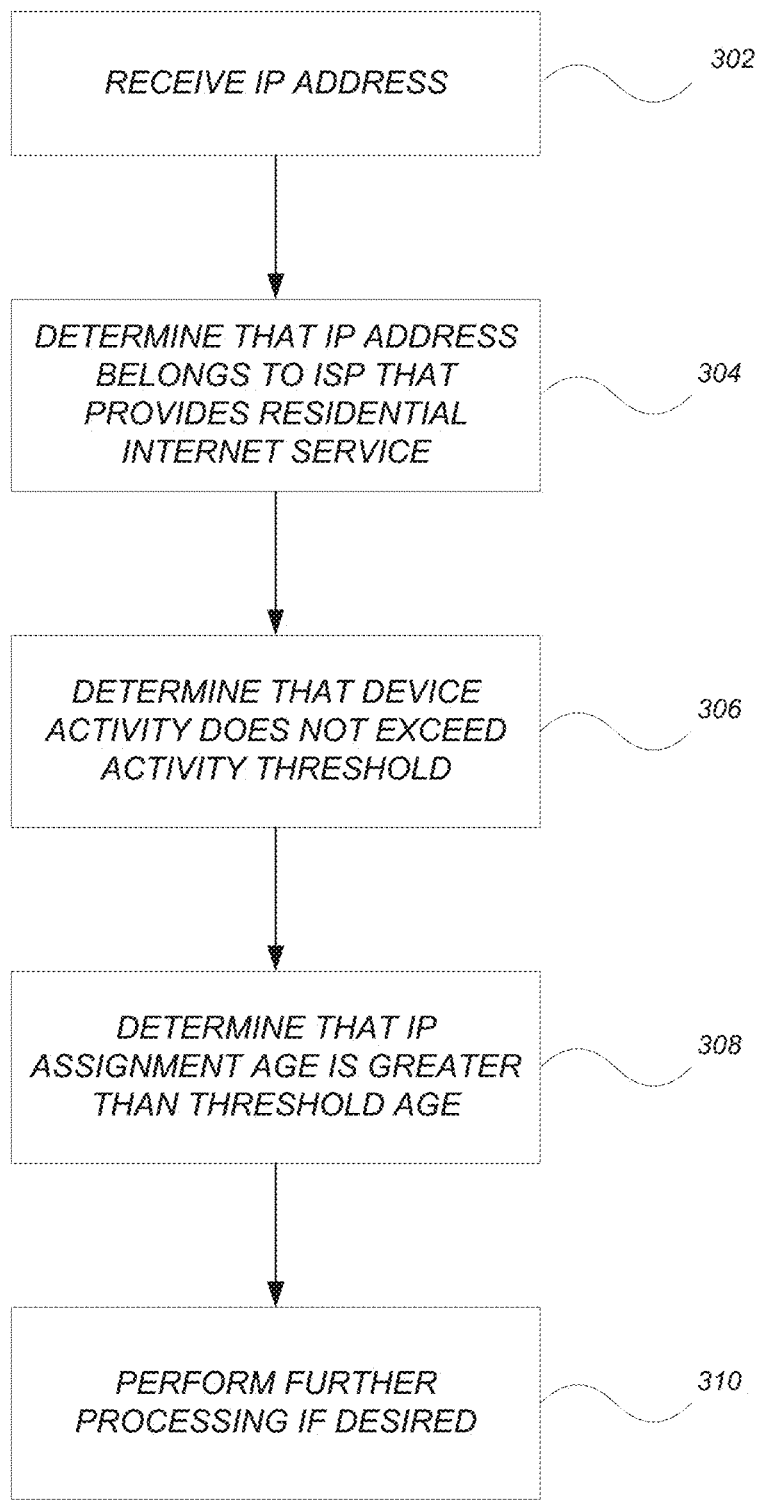
FIG. 3 illustrates the logical flow for identifying an internet connected household in accordance with one or more embodiments of the invention.

FIG. 3 illustrates the logical flow for identifying an internet connected household in accordance with one or more embodiments of the invention.

At step 302, an IP address is received at an Internet entity. For example, the IP address may be attached to an HTTP request received at a web server.

At step 304, a determination is made regarding whether the IP address belongs to an ISP that provides residential internet service (e.g., referred to herein as the residential internet service status). In this regard, based on information from an RIR, the ISP assigned an IP range block (that includes the IP address) can be identified. Thereafter, based on publicly available information, the ISP can be classified as providing or not providing residential internet service. Accordingly, step 304 serves to filter out IP addresses (from further processing) that are from non-residential service based ISPs (e.g., those that solely provide business based services). In one or more embodiments, the publicly available information may be gathered and stored in a database (local or network based). Thus, the database may include ISPs that provide residential service, ISPs that do not provide residential service (and/or both). A simple comparison of the ISP to the list of ISPs in the database may be conducted to determine whether the IP address belongs to an ISP that provides residential internet service.

At step 306, a determination is made regarding whether the device activity from the IP address exceeds a defined activity threshold (e.g., referred to herein as a device activity status). To make such a determination, activity from the IP address may be monitored over a period of time. Further, a "defined activity threshold" for the level of activity for ICHs may be determined. For example, the average level of activity for ICHs may be determined based on monitoring such activity over a period of time. Alternatively, any other method may be used to determine the activity threshold (e.g., a user specified level of activity, an ISP specified level of activity, etc.). Once the defined activity threshold has been determined (e.g., obtained from a database, computed, etc.), the level is compared to the level of activity from the IP address that has been monitored. If the level of activity exceeds the activity threshold, the system assumes that the IP address is not for an ICH, and filters out the IP address from further processing. However, if the level of activity does not exceed the activity threshold, then the IP address is not eliminated from further consideration/processing.

At step 308, a determination is made regarding whether the IP assignment age for the IP address is greater than a defined threshold age (referred to herein as the IP assignment age status). In this regard, step 308 is used to ensure that the IP address is static enough that it can serve as an identifier for a reasonable period of time. In other words, to effectively use an IP address for further processing, the IP address must be static enough that it identifies a particular household.

Often times, an IP address is reassigned when a household restarts a modem or for a variety of other reasons. Accordingly, embodiments of the invention may observe a number of connecting IP addresses from the ISP over a defined period of time. As described above, two IP addresses belonging to the same ISP are "connected" when a user has generated activity from both of the two IP addresses (e.g., the user may be identified from a cookie, username, registration, etc.). A large increase in the IP's number of connecting IPs or users indicates the IP may have rotated and the assignment age is set back to zero (0) days making it invalid to serve as a unique identifier until its assignment age regains maturity.

Once the IP assignment age for the connecting IP addresses is computed, it can be compared to a threshold age (e.g., 45 days) to determine if the address is static enough to use for further processing.

At step 310, it may be determined that the IP address corresponds to an ICH (e.g., per steps 302-306) with sufficient information (e.g. per step 308) to enable additional processing. Thus, based on the residential internet service status, device activity status, and IP assignment age status, a determination can be made regarding whether the IP address is associated with an ICH or not.

If the IP address is associated with/corresponds to an ICH, additional processing may be performed. Such additional processing may measure the ICH's exposure to content from a specific content owner. Alternatively, a data store may be created based on the device activity from the ICH. The data store may be used to store information regarding interests, activity, and actions from the device. Based on the data store, additional content (e.g., advertising or other content) may be dynamically selected and/or delivered to the device.

In addition to the above, step 310 may include various additional steps. For example, once an IP address is determined to belong to an ICH, further actions may be performed based on devices utilizing that IP address. For example, once a device is resolved to an IP address of an ICH (e.g., via home wifi), a physical address of the device may be determined. In this regard, the device may offer up a GPS (global positioning system) latitude/longitude coordinates that can be used to coordinate/correspond to a physical address (e.g., 123 Main Street). The physical address may be used to create an anonymous ID (based off the address) which can then be used as a universal ID to resolve new IP addresses and other devices back to that address. As an example, once one device associated with an IP address corresponding to an ICH has been determined, and a physical address has been determined, any other IP addresses associated with the ICH may also be assigned to that physical address. Analysis may then be conducted on the different devices having the same physical address (e.g., resulting in demographic information for users at that physical address, access patterns for sub-groups of users at that physical address [and demographic information for such sub-users], etc.).

Out-of-Home Identifier

Embodiments of the invention provide options for an end-user to choose a preferred "identifier" at a campaign level. In other words, an option/switch is provided that enables the user to choose between using traditional device IDs vs. household identifiers. As used herein, the end-user refers to an advertiser/media content provider that is providing media content/advertising to fill an impression/request initiated by a different user. When a household identifier is chosen, a campaign (i.e., an advertising/media content targeting campaign) is switched to using generic IPs for a frequency cap (a limit to the number of times a display or video ad appears to the same person) and household IPs for audience targeting. As used herein, a campaign refers to any level of the hierarchy of a media buying system and further includes a flight, order, line, etc. In view of the above, the use of household IPs for audience targeting includes use of a household IP address outside of the home/household. More specifically, a household audience/audience member is treated/considered as a household when a data element is available (such as a private publisher ID, a cookie, a known device ID, etc.). The availability of the data element (and the selection of the option to use household identifiers) enables/allows the component/entity/application associated with the data element to be mapped back to the household the user is a member of.

Figure 4:
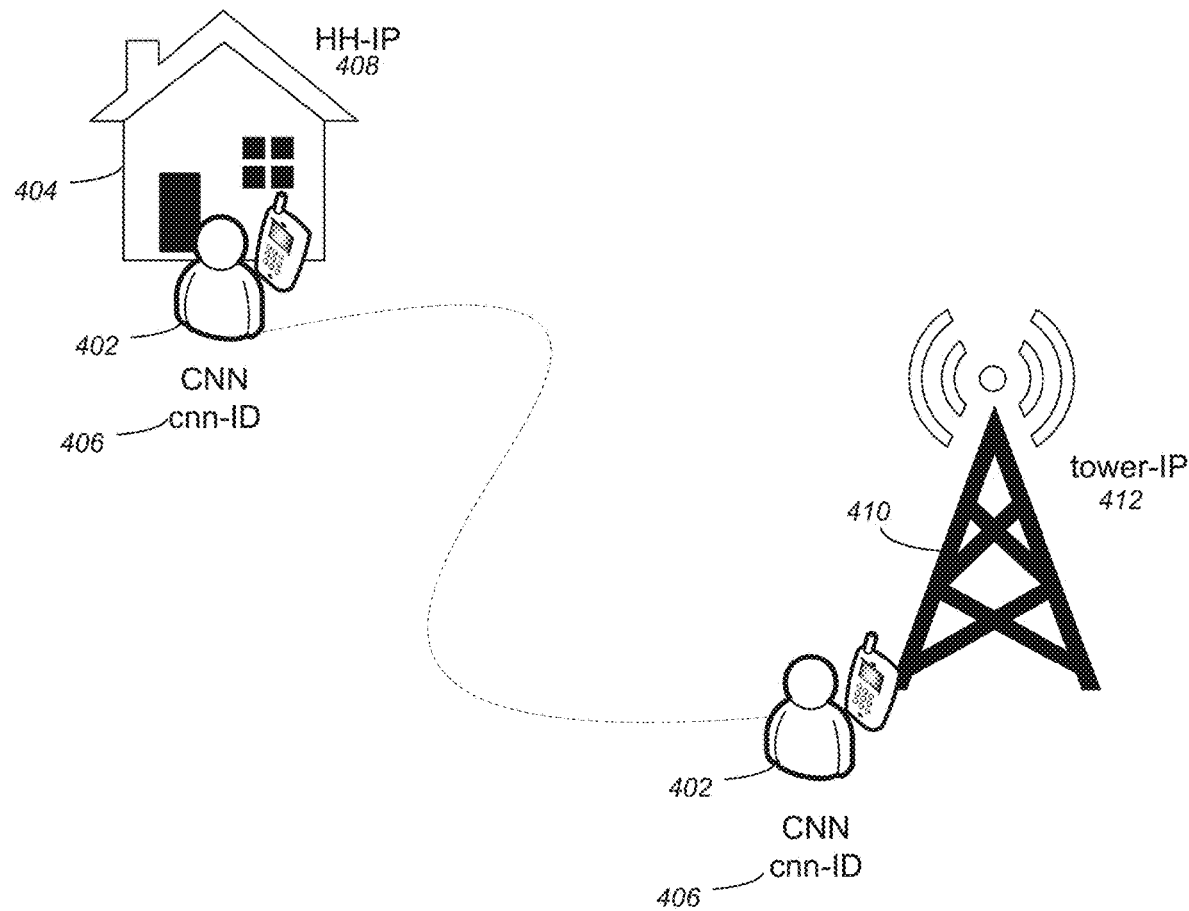
FIG. 4 illustrates a real-world example of utilizing a household identifier out of the home in accordance with one or more embodiments of the invention.

FIG. 4 illustrates a real-world example of utilizing a household identifier out of the home in accordance with one or more embodiments of the invention. While the user 402 is at home 404, the publisher (e.g., CNN), passes an identifier, in this example a $1^{st}$ party cookie 406 (e.g., cnn-ID) with advertisement bid requests, that a web/advertising server associates to a household ID (i.e., HH-IP [household IP] 408) as described above. Use of $1^{st}$ party cookies, would be provided by publishers (e.g., CNN) as that $1^{st}$ party cookie or ID 406 is needed for frequency capping. When the user 402 is out of the home 404 (e.g., near a cellular tower 410), any HTTP request (or advertisement bid request) may be received via/originate from another IP address (e.g., tower-IP 412). The server is aware that the user 402 is issuing a new HTTP request (or a request for an advertisement) based on the data element/$1^{st}$ party cookie/ID 406. In this way, the data element/$1^{st}$ party cookie/ID is associated with the HH-IP 408 and any targeting towards the household occupants may be used to target the device/individual associated with the data element/$1^{st}$ party cookie/ID, regardless of the location (e.g., in home 404 or near cell tower 410) of the user 402. Further, any IPs associated with the household occupants may be used to populate a user/household pool (that may be used to further target users).

As described above, often times, cookies and MAIDs (mobile ad identifier such as an IFA/IFDA [identifier for advertisers]]) may no longer be available from supply sources and $3^{rd}$ party data providers. However, a user-agent (UA) (e.g., as from an HTTP header) as well as latitude and longitudinal coordinates (i.e., geo-position) (as described above and in the applications incorporated by reference) may still be available for use. In this regard, an IP address may be used for a geo-lookup and once a geo-position is known, the geo-position may be used for targeting (relative to the user position as well as for regulatory restrictions (e.g., GDPR, CCPA [California Consumer Privacy Act], etc.)

Further to the above, to enable the use of household IDs out of the home, a data element is mapped to a household ID via a household alias. Such data elements may include: (1) cookies/MAIDs; (2) publisher IDs; and (3) hashed emails. Such a mapping (e.g., in the form of a table or otherwise) may be to a set of HH-IPs. However, in one or more embodiments, the mapping may only be to a single IP. In alternative embodiments, multiple HH-IPs may be mapped.

Household Alias Mapping Conflict Resolution

A described above, a user device (via a data element/$1^{st}$ party cookie/ID) may be assigned to a primary household (e.g., based on a data element that identifies the user and an HTTP request originating from a particular household). When that user device visits an additional household (e.g., a friend's house), the data element is considered a foreign ID with respect to the IP address of the additional household. Consequently, as a user moves to distinct households, the same foreign ID (i.e., a cookie or data element that is not the primary household for that ID) may be aliased to different households. To solve this issue, a frequency may be used to assign the foreign ID to alias to a particular household ID. In this regard, the frequency with which an ID is seen in a household within a defined period (e.g., 30 days) may be used to determine which household to associate the user with (i.e., which household will serve as the primary household for a user).

Unavailability of Household IP

For requests where the household IP is not available, household campaign eligibility (i.e., the ability to utilize/target an advertising campaign based on a household ID) may be extended based on aliased household IDs. In this regard, a household IP may be looked-up using any existing ID/data element for household aliases. If multiple household IPs are resolved by several data elements/IDS, the household IP with the highest frequency for that data element (e.g., within a 30-day rolling window) may be used. When an aliased ID is found, the request is made eligible for the matching household and the aliased household audience profile may be utilized for targeting.

Measurement

Measurement and Attribution are industry practices to assign an event, say a click, or a registration (conversion) on a website, to a specific campaign. In this way business metrics, usually revenue, are attributed to such campaign in the way that follows. A typical scenario is that the server logs an event for a campaign at the time the ad is displayed for a user. When the user later clicks, buys or lands on a designated page, a pixel will be originated from the secondary web site. Traditionally by means of tracking, via $3^{rd}$ party cookies or other IDs, servers can backtrack the registration to the originating campaign (via the pixel), hence attributing the event (to the campaign). A matching campaign will store/associate the conversion pixel used and this association should be within the seek window (for any further searches). As used herein, the seek window is how far back in time a certain campaign's impression originated.

When working with Household identifiers, embodiments of the invention may provide support for one or more of the following cases:
  When the campaign's ad impression and the conversion happen within the same household
    In this case, embodiments may enable access to the household IP and can match a WWC (world without cookies) campaign in a log identified by the same household ID.
  When the campaign's ad impression and the conversion happen within different households
    If there is an ID aliased to the original household, embodiments of the invention can backtrack to the WWC campaign
  When the campaign's ad impression originates in a household and the conversion happens out of a household
    Similar to previous point, if there is an ID aliased to the original household, embodiments can backtrack to the WWC campaign
  When the campaign's ad impression originates out of home and the conversion happens in a household
    In this case, embodiments can backtrack to a campaign if an alias is available at impression time: when a registration happens in a household, embodiments can backtrack matching the same household Reporting Embodiments of the invention may also enable reports to be provided. Reports may include surveys, cross-channel reports, digital out-of-home reports, MTA (Metropolitan Transportation Authority) reports, foot traffic reports, planning tools, television reports, and custom reports. Such reports may include workflows that perform operations (e.g., aggregating by, counting, etc.) on device IDs. Reporting, metrics may be provided on a defined time/period/frequency basis (e.g., daily, weekly, and/or a specified time period such as 1 day, 7 days, 14 days, 30 days, etc.). For example, reports may include the number of households reached and the frequency of the number of impressions per household. Reporting metrics may also be based on impressions/uniques for household and nor non-household impressions. Further, if a request is made to honor a user's privacy, ad data may be removed from a household IP profile.

Users may request different cohorts for reach and frequency along a customizable data range. For example, a client user may request (and the report may provide) lifetime household reach and frequency across one or many campaigns, order, lines, etc. Reporting screen may include advertiser screens, campaign screens, order screens, and line screen. Metrics may be based on households and/or household frequency. As used herein, household frequency means the number of times a household was served an impression. This may be calculated by measurable household impressions divided by total unique households.

Logical Flow

As described above, the cross-referenced patent applications identify and recognize whether an IP address corresponds to a household or not. Based on a request for media content/advertising that originates from a household IP address, persons (and the content/advertising) may be targeted/personalized (i.e., based on the household association). Thus, use of a household IP only targets people when they are physically in a household/home. Unfortunately, the personalization/targeting based on household may only provide coverage for 70-80% of media content/advertising requests. Further, the use of $3^{rd}$ party cookies is becoming more and more rare, there are a lot of security concerns, and search engines (e.g., the GOOGLE search engine) are less available for advertising (e.g., compared to the past such as 1 year or more ago). Consequently, it is desirable to target/personalize media content/advertising when people are out of the home.

Embodiments of the invention extend the ability to target users from a household when they are outside of the home.

Figure 5:
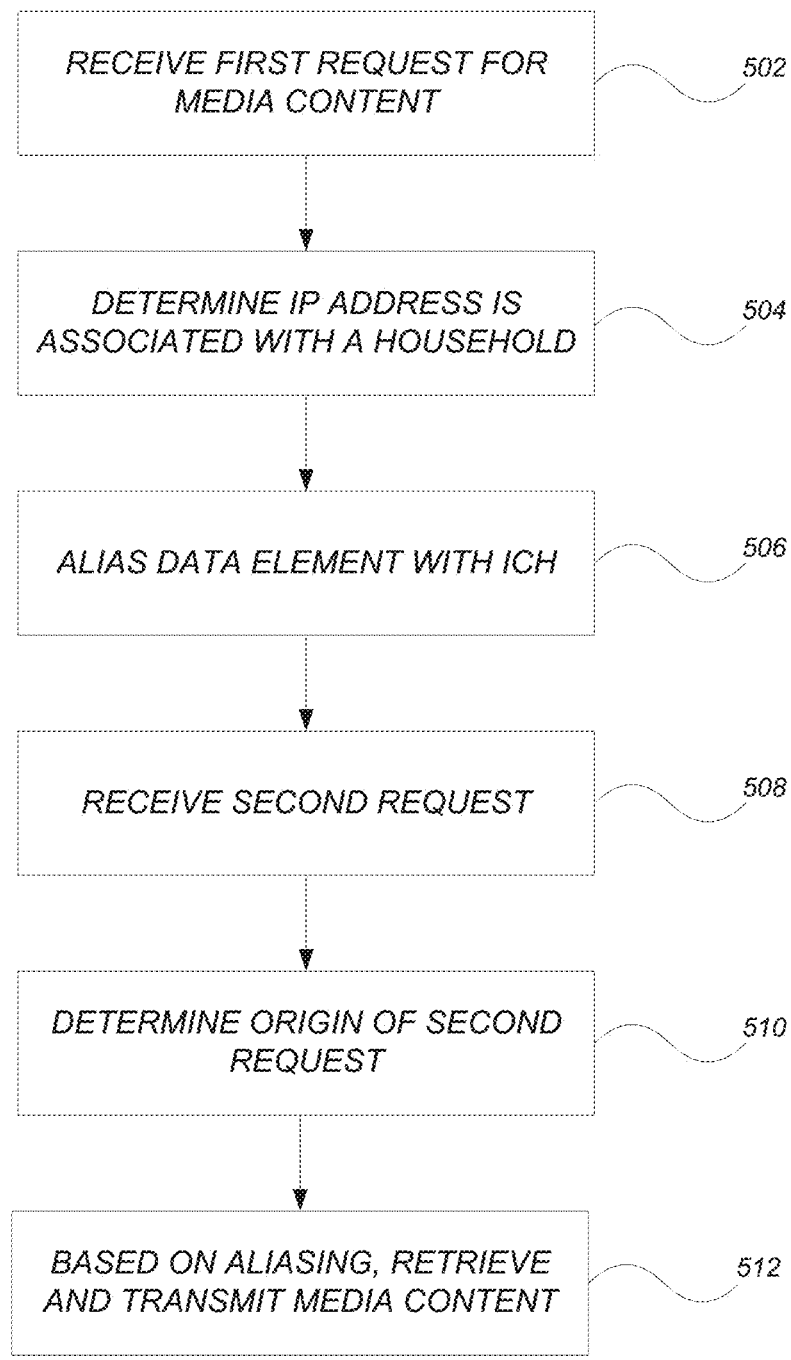
FIG. 5 illustrates the logical flow for providing media content based on a household when out-of-home in accordance with one or more embodiments of the invention.

FIG. 5 illustrates the logical flow for providing media content based on a household when out-of-home in accordance with one or more embodiments of the invention.

At step 502, a first request for media content is received. The first request originates from a first IP address via an internet connection. Further, the first request includes a first data element identification that is associated with a first user. Such a first data element identification can be any identifier such as a device ID, a $1^{st}$ party cookie, a heuristically developed ID, etc.

At step 504, based on the first IP address, a determination is made that the first IP address is associated with a first internet connected household (ICH). Such a determination may be made based on a variety of factors. In one or more embodiments, the factors include: (1) a device activity status that is determined based on whether device activity from the first IP address exceeds a defined activity threshold; (2) an IP assignment age status that is determined based on whether an IP assignment age for the first IP address is greater than a defined threshold age; and (3) a residential internet service status that is based on whether the first IP address belongs to an Internet Service Provider (ISP) that provides residential internet service.

At step 506, the first data element identification is aliased with the first ICH. Such an aliasing may be performed by maintaining a household alias table. Such a household alias table maintains a mapping from each data element identification to a household identification. Each household identification identifies/corresponds to an internet connected household (ICH). In one or more embodiments, the first data element identification is only permitted to be aliased to a single ICH at any given time. If requests that include the first data element identification are received from multiple different ICHs, a frequency may be used to determine which ICH to alias the first data element identification with. For example, a first frequency of requests (that includes the first data element identification) that originates from the first IP address is determined. Similarly, a second frequency of requests (that includes the first data element identification) that originates from the second IP address is determined. The first frequency is then compared to the second frequency. The first data element identification is aliased with the first ICH when a first frequency is higher than the second frequency, and it is aliased with the second ICH when the second frequency is higher than the first frequency.

At step 508, a second request for media content is received. The second request originates from a second IP address. Further, the second IP address corresponds to a non-household IP address (i.e., a different household than the first ICH and/or an IP address that is not associated with a household [e.g., a cellular tower]). In addition, the second request also includes the first data element identification.

At step 510, based on the first data element in the second request, a determination is made that the second request is originating from the first user at a location other than the first ICH.

At step 512, in response to the second request and based on the aliasing, media content/advertising is retrieved (wherein the media content/advertising is based on the first ICH) and transmitted to the first user at the out-of-home location.

In one or more embodiments, steps 502-5012 may also include the ability to provide an option to select a preferred identifier to utilize at a campaign level. Such an option is between the use of a traditional device ID or a household identifier in an advertising campaign. Upon/in response to selection of the household identifier as the preferred identifier, any IP address (i.e., a generic IP address and/or any IP address including a household or non-household based IP address) is used for a frequency cap and a household IP address is used for audience targeting. As used herein, the frequency cap comprises a maximum number of times media content is delivered to any IP address. Further, the household IP address includes any IP address that has been associated with the first ICH or any other ICH.

Hardware Environment

Figure 6:
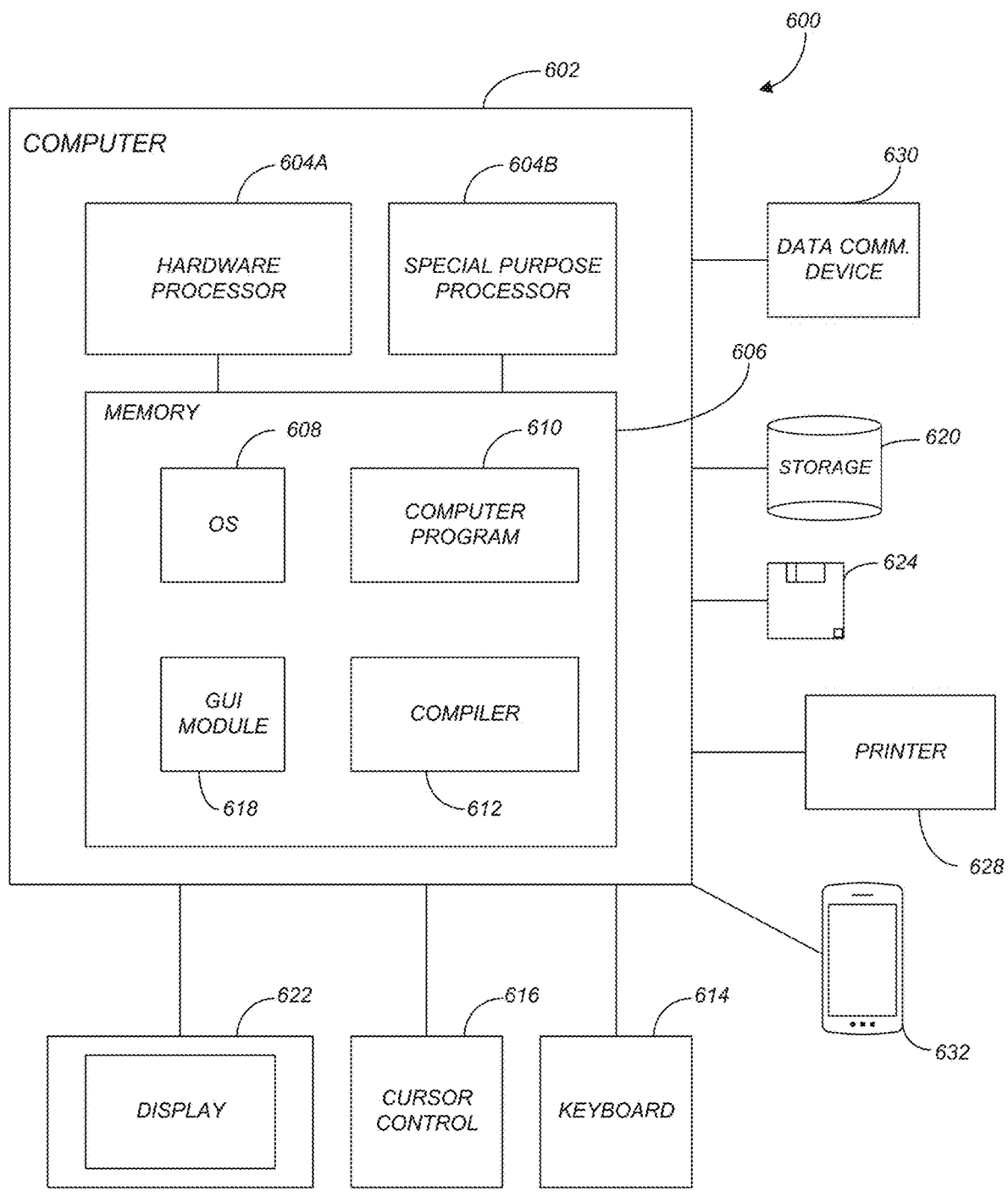
FIG. 6 is an exemplary hardware and software environment used to implement one or more embodiments of the invention.

FIG. 6 is an exemplary hardware and software environment 600 (referred to as a computer-implemented system and/or computer-implemented method) used to implement one or more embodiments of the invention. The hardware and software environment includes a computer 602 and may include peripherals. Computer 602 may be a user/client computer, server computer, or may be a database computer. The computer 602 comprises a hardware processor 604A and/or a special purpose hardware processor 604B (hereinafter alternatively collectively referred to as processor 604) and a memory 606, such as random access memory (RAM). The computer 602 may be coupled to, and/or integrated with, other devices, including input/output (I/O) devices such as a keyboard 614, a cursor control device 616 (e.g., a mouse, a pointing device, pen and tablet, touch screen, multi-touch device, etc.) and a printer 628. In one or more embodiments, computer 602 may be coupled to, or may comprise, a portable or media viewing/listening device 632 (e.g., an MP3 player, IPOD, NOOK, portable digital video player, cellular device, personal digital assistant, etc.). In yet another embodiment, the computer 602 may comprise a multi-touch device, mobile phone, gaming system, internet enabled television, television set top box, or other internet enabled device executing on various platforms and operating systems.

In one embodiment, the computer 602 operates by the hardware processor 604A performing instructions defined by the computer program 610 (e.g., a computer-aided design [CAD] application) under control of an operating system 608. The computer program 610 and/or the operating system 608 may be stored in the memory 606 and may interface with the user and/or other devices to accept input and commands and, based on such input and commands and the instructions defined by the computer program 610 and operating system 608, to provide output and results.

Output/results may be presented on the display 622 or provided to another device for presentation or further processing or action. In one embodiment, the display 622 comprises a liquid crystal display (LCD) having a plurality of separately addressable liquid crystals. Alternatively, the display 622 may comprise a light emitting diode (LED) display having clusters of red, green and blue diodes driven together to form full-color pixels. Each liquid crystal or pixel of the display 622 changes to an opaque or translucent state to form a part of the image on the display in response to the data or information generated by the processor 604 from the application of the instructions of the computer program 610 and/or operating system 608 to the input and commands. The image may be provided through a graphical user interface (GUI) module 618. Although the GUI module 618 is depicted as a separate module, the instructions performing the GUI functions can be resident or distributed in the operating system 608, the computer program 610, or implemented with special purpose memory and processors.

In one or more embodiments, the display 622 is integrated with/into the computer 602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program 610 instructions. In one embodiment, the special purpose processor 604B is an application specific integrated circuit (ASIC).

The computer 602 may also implement a compiler 612 that allows an application or computer program 610 written in a programming language such as C, C++, Assembly, SQL, PYTHON, PROLOG, MATLAB, RUBY, RAILS, HASKELL, or other language to be translated into processor 604 readable code. Alternatively, the compiler 612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 610 accesses and manipulates data accepted from I/O devices and stored in the memory 606 of the computer 602 using the relationships and logic that were generated using the compiler 612.

The computer 602 also optionally comprises an external communication device such as a modem, satellite link, Ethernet card, or other device for accepting input from, and providing output to, other computers 602.

In one embodiment, instructions implementing the operating system 608, the computer program 610, and the compiler 612 are tangibly embodied in a non-transitory computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of computer program 610 instructions which, when accessed, read and executed by the computer 602, cause the computer 602 to perform the steps necessary to implement and/or use the present invention or to load the program of instructions into a memory 606, thus creating a special purpose data structure causing the computer 602 to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 602.

Figure 7:
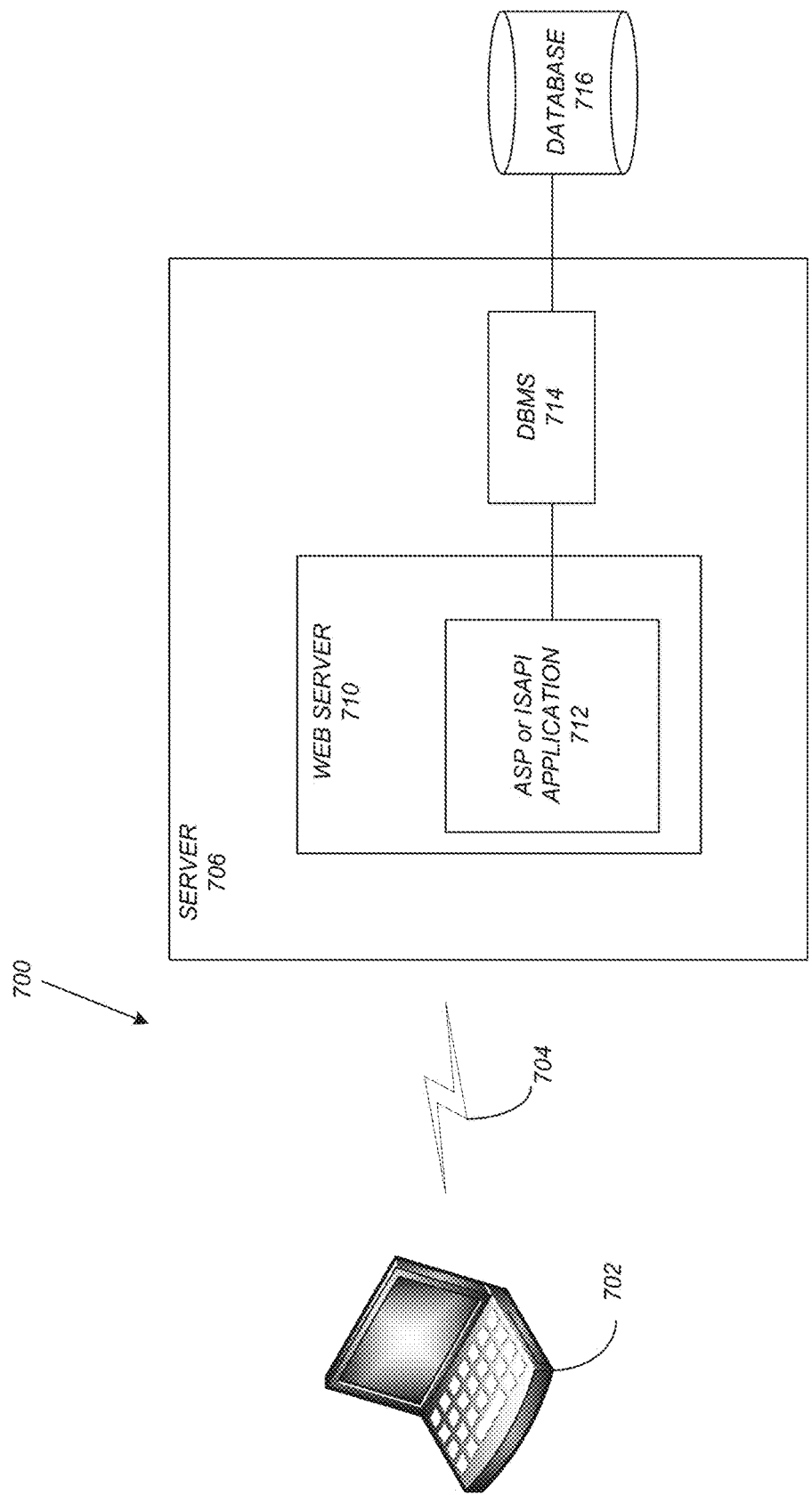
FIG. 7 schematically illustrates a typical distributed/cloud-based computer system in accordance with one or more embodiments of the invention.

FIG. 7 schematically illustrates a typical distributed/cloud-based computer system 700 using a network 704 to connect client computers 702 to server computers 706. A typical combination of resources may include a network 704 comprising the Internet, LANs (local area networks), WANs (wide area networks), SNA (systems network architecture) networks, or the like, clients 702 that are personal computers or workstations (as set forth in FIG. 6), and servers 706 that are personal computers, workstations, minicomputers, or mainframes (as set forth in FIG. 6). However, it may be noted that different networks such as a cellular network (e.g., GSM [global system for mobile communications] or otherwise), a satellite based network, or any other type of network may be used to connect clients 702 and servers 706 in accordance with embodiments of the invention.

A network 704 such as the Internet connects clients 702 to server computers 706. Network 704 may utilize ethernet, coaxial cable, wireless communications, radio frequency (RF), etc. to connect and provide the communication between clients 702 and servers 706. Further, in a cloud-based computing system, resources (e.g., storage, processors, applications, memory, infrastructure, etc.) in clients 702 and server computers 706 may be shared by clients 702, server computers 706, and users across one or more networks. Resources may be shared by multiple users and can be dynamically reallocated per demand. In this regard, cloud computing may be referred to as a model for enabling access to a shared pool of configurable computing resources.

Clients 702 may execute a client application or web browser and communicate with server computers 706 executing web servers 710. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 702 may be downloaded from server computer 706 to client computers 702 and installed as a plug-in or ACTIVEX control of a web browser. Accordingly, clients 702 may utilize ACTIVEX components/component object model (COM) or distributed COM (DCOM) components to provide a user interface on a display of client 702. The web server 710 is typically a program such as MICROSOFT'S INTERNET INFORMATION SERVER.

Web server 710 may host an Active Server Page (ASP) or Internet Server Application Programming Interface (ISAPI) application 712, which may be executing scripts. The scripts invoke objects that execute business logic (referred to as business objects). The business objects then manipulate data in database 716 through a database management system (DBMS) 714. Alternatively, database 716 may be part of, or connected directly to, client 702 instead of communicating/ obtaining the information from database 716 across network 704. When a developer encapsulates the business functionality into objects, the system may be referred to as a component object model (COM) system. Accordingly, the scripts executing on web server 710 (and/or application 712) invoke COM objects that implement the business logic. Further, server 706 may utilize MICROSOFT'S TRANSACTION SERVER (MTS) to access required data stored in database 716 via an interface such as ADO (Active Data Objects), OLE DB (Object Linking and Embedding DataBase), or ODBC (Open DataBase Connectivity).

In one or more embodiments of the invention, server 706 (or multiple connected servers 706) may include a content hub, advertising exchange, publisher, real-time bidding server, demand side platform, supply side platform, etc. Advertisements/media content may be stored in database 716. In one or more embodiments a website publisher selects and serves media content/ads (which may be provided by a content hub/media content provider/advertising agency [e.g., that may consist of an additional server 706]).

In additional embodiments, advertising/media content may be offered for sale in a bidding market using an ad exchange and real-time bidding. For example, in response to a request from the user's browser, a publisher content server may send the web page content to the user's browser (i.e., executing on client 702) over the Internet 704. Such a web page may not contain dynamic media content/advertisements but contains links that cause the user's browser to connect to a publisher ad server to request that the spaces left be filled in with media content/advertisements (e.g., with user identifying information such as cookies and the page being viewed transmitted to the publisher ad server).

The publisher ad server may then communicate with a supply-side platform (SSP) server (where the publisher is considered the supplier). The SSP sends the user's identifying information and the information about the space to be filled to a data management platform. The data management platform analyzes the received information and may gather additional information about the user that is then sent back to the SSP. The SSP puts together an offer that includes information about the space to be filled and the user that is viewing it. The offer is sent to an ad exchange server that in turn may put the offer out to bid to demand-side platforms. The ad exchange server runs an auction/bidding process, picks the winning bid, informs the relevant parties, and passes the link to the media content/advertisement back through the SSP and the publisher's server to the user's browser which then requests the media content/advertisement from an agency's server.

Generally, these components 700-716 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 702 and 706 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 702 and 706. Embodiments of the invention are implemented as a software/CAD application on a client 702 or server computer 706. Further, as described above, the client 702 or server computer 706 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for providing media content comprising:
   (a) receiving a first request for media content, wherein:
      (i) the first request originates from a first Internet Protocol (IP) address; and
      (ii) the first request comprises a first data element identification, wherein the first data element identification comprises a publisher generated 1st party cookie, and wherein the first data element identification does not comprise a 3rd party cookie;
      (iii) the first data element is associated with a first device; (b) determining, based on the first IP address that the first IP address is associated with a first internet connected household (ICH);
   (c) aliasing the first data element identification with the first ICH;
   (d) receiving a second request for media content, wherein:
      (i) the second request originates from a second IP address; and
      (ii) the second IP address corresponds to a non-household IP address;
      (iii) the second request comprises the first data element identification;
   (e) based on the first data element in the second request, recognizing that the same publisher generated 1st party cookie is received from both the first ICH and a non-household; and
   (f) in response to the second request and based on the recognizing and the aliasing of the first data element identification with the first ICH:
      (1) retrieving media content based on the first ICH; and
      (2) transmitting the media content to the first device at the non-household location.

2. The computer-implemented method of claim 1, wherein the first data element identification comprises a device ID.

3. The computer-implemented method of claim 1, wherein the determining that the first IP address is associated with a first ICH comprises:
   determining a device activity status based on whether device activity from the first IP address exceeds a defined activity threshold; and
   determining whether the first IP address is associated with the first ICH based on the device activity status.

4. The computer-implemented method of claim 1, wherein the determining that the first IP address is associated with a first ICH comprises:
   determining an IP assignment age status based on whether an IP assignment age for the first IP address is greater than a defined threshold age; and
   determining whether the first IP address is associated with the first ICH based on the IP assignment age status.

5. The computer-implemented method of claim 1, wherein the aliasing the first data element identification with the first ICH comprises:
   maintaining a household alias table, wherein:
   the household alias table maintains a mapping from each data element identification to a household identification; and
   each household identification identifies an ICH.

6. The computer-implemented method of claim 1, further comprising:
   providing an option to select a preferred identifier to utilize at a campaign level, wherein the option is between a traditional device ID or a household identifier;
   receiving selection of the household identifier as the preferred identifier;
   based on the selection, using any IP address for a frequency cap and a household IP address for audience targeting, wherein:
   the frequency cap comprises a maximum number of times media content is delivered to any IP address; and
   the household IP address comprises any IP address that has been associated with the first ICH or any other ICH.

7. The computer-implemented method of claim 1, wherein the first data element identification is only permitted to be aliased to a single ICH at any given time.

8. The computer-implemented method of claim 7, further comprising:
   determining a first frequency of requests comprising the first data element identification that originates from the first IP address;
   determining a second frequency of requests comprising the first data element identification that originates from the second IP address;
   comparing the first frequency to the second frequency;
   aliasing the first data element identification with the first ICH when a first frequency is higher than the second frequency; and
   aliasing the first data element identification with the second ICH when the second frequency is higher than the first frequency.

9. A computer-implemented method for receiving media content comprising:
   (a) sending, from a first device to a server, a first request for media content, wherein:
   (i) the first request originates form a first Internet Protocol (IP) address;
   (ii) the first request comprises a first data element identification, wherein the first data element identification comprises a publisher generated 1st party cookie, and wherein the first data element identification does not comprise a 3rd party cookie;
   (iii) the first data element is associated with the first device;
   (b) determining, on the server, based on the first IP address that the first IP address is associated with a first internet connected household (ICH);
   (c) aliasing, on the server, the first data element identification with the first ICH;
   (d) sending, from the first device to the server, a second request for media content, wherein:
   (i) the second request originates from a second IP address; and
   (ii) the second IP address corresponds to a non-household IP address;
   (iii) the second request comprises the first data element identification;
   (e) based on the first data element in the second request, the server recognizing that the same publisher generated 1st party cookie is received from both the first ICH and a non-household; and
   (f) the first device receiving, from the server, media content at the non-household location in response to the second request and based on the recognizing and the aliasing of the first data element identification with the first ICH.

10. A system for providing media content, comprising:
   (a) a server computer comprising a memory, and a processor;
   (b) the processor executing on the server computer;
   (c) the memory storing a set of instructions, wherein the set of instructions, when executed by the processor, cause the processor to perform operations comprising:
   (i) receiving a first request for media content, wherein:
   (1) the first request originates from a first Internet Protocol (IP) address; and
   (2) the first request comprises a first data element identification, wherein the first data element identification comprises a publisher generated 1st party cookie, and wherein the first data element identification does not comprise a 3rd party cookie;
   (3) the first data element is associated with a first device;
   (ii) determining, based on the first IP address that the first IP address is associated with a first internet connected household (ICH);
   (iii) aliasing the first data element identification with the first ICH;
   (iv) receiving a second request for media content, wherein:
   (1) the second request originates from a second IP address; and
   (2) the second IP address corresponds to a non-household IP address;
   (3) the second request comprises the first data element identification;
   (v) based on the first data element in the second request, recognizing that the same publisher generated 1st party cookie is received from both the first ICH and a non-household; and
   (vi) in response to the second request and based on the recognizing and the aliasing of the first data element identification with the first ICH:
   (1) retrieving media content based on the first ICH; and
   (2) transmitting the media content to the first device at the non-household location.

11. The system of claim 10, wherein the first data element identification comprises a device ID.

12. The system of claim 10, wherein the operations determine that the first IP address is associated with a first ICH by:
   determining a device activity status based on whether device activity from the first IP address exceeds a defined activity threshold; and
   determining whether the first IP address is associated with the first ICH based on the device activity status.

13. The system of claim 10, wherein the operations determine that the first IP address is associated with a first ICH by:
   determining an IP assignment age status based on whether an IP assignment age for the first IP address is greater than a defined threshold age; and
   determining whether the first IP address is associated with the first ICH based on the IP assignment age status.

14. The system of claim 10, wherein the operations alias the first data element identification with the first ICH by:
   maintaining a household alias table, wherein:
      the household alias table maintains a mapping from each data element identification to a household identification; and
      each household identification identifies an ICH.

15. The system of claim 10, wherein the operations further comprise:
   providing an option to select a preferred identifier to utilize at a campaign level, wherein the option is between a traditional device ID or a household identifier;
   receiving selection of the household identifier as the preferred identifier;
   based on the selection, using any IP address for a frequency cap and a household IP address for audience targeting, wherein:
   the frequency cap comprises a maximum number of times media content is delivered to any IP address; and
   the household IP address comprises any IP address that has been associated with the first ICH or any other ICH.

16. The system of claim 10, wherein the first data element identification is only permitted to be aliased to a single ICH at any given time.

17. The system of claim 16, wherein the operations further comprise:
   determining a first frequency of requests comprising the first data element identification that originates from the first IP address;
   determining a second frequency of requests comprising the first data element identification that originates from the second IP address;
   comparing the first frequency to the second frequency;
   aliasing the first data element identification with the first ICH when a first frequency is higher than the second frequency; and
   aliasing the first data element identification with the second ICH when the second frequency is higher than the first frequency.

* * * * *